US012502907B1

(12) United States Patent
Harris et al.

(10) Patent No.: US 12,502,907 B1
(45) Date of Patent: Dec. 23, 2025

(54) ERGONOMIC DEVICE FOR WRITING INSTRUMENT AND RELATED METHODS

(71) Applicant: Kynesius Corporation, Ocoee, FL (US)

(72) Inventors: William H. Harris, Ocoee, FL (US); Matthew Alexander, Lake Arrowhead, CA (US); Steven Chihos, Chuluota, FL (US)

(73) Assignee: KYNESIUS CORPORATION, Ocoee, FL (US)

( * ) Notice: Subject to any disclaimer, the term of this patent is extended or adjusted under 35 U.S.C. 154(b) by 0 days.

(21) Appl. No.: 19/227,680

(22) Filed: Jun. 4, 2025

Related U.S. Application Data

(63) Continuation-in-part of application No. 30/006,269, filed on May 30, 2025.

(51) Int. Cl.
B43K 23/008 (2006.01)
B43K 23/00 (2006.01)

(52) U.S. Cl.
CPC .................. B43K 23/008 (2013.01)

(58) Field of Classification Search
CPC ...... B43K 23/008; B43K 23/12; B43K 24/04; B43K 23/001; B43K 23/004; G09B 11/02
USPC .......................................................... 294/25
See application file for complete search history.

(56) References Cited

U.S. PATENT DOCUMENTS

| | | | | |
|---|---|---|---|---|
| 2,273,044 A | * | 2/1942 | Johnson | B43K 23/012 401/8 |
| 3,662,372 A | * | 5/1972 | Levy | G08B 25/00 340/520 |
| 4,846,710 A | * | 7/1989 | Campbell | G09B 11/02 434/166 |
| D328,920 S | * | 8/1992 | Kimball | D19/135 |
| 5,310,345 A | * | 5/1994 | Gershon | G09B 11/02 15/443 |
| 6,254,293 B1 | | 7/2001 | Citrenbaum | |
| 6,328,494 B1 | | 12/2001 | Moxon | |
| 6,895,639 B1 | * | 5/2005 | Bayton | A61F 4/00 30/298 |
| 6,988,295 B2 | | 1/2006 | Tillim | |
| 8,745,825 B2 | | 6/2014 | Gitman et al. | |

(Continued)

OTHER PUBLICATIONS

"Pencil Grips 8PCS Silicone Pencil Holder Pen Writing Aid Grip Posture Correction Tool for Kids Preschoolers Children Adults Students in Special Needs" https://www.amazon.com.au/Silicone-Correction-Preschoolers-Children-Students/dp/B0CJ6HL8WM: Retreived from internet Apr. 2, 2025; pp. 3.

Primary Examiner — Paul T Chin
(74) Attorney, Agent, or Firm — Allen, Dyer, Doppelt + Gilchrist PA

(57) ABSTRACT

An ergonomic device is for a writing instrument. The ergonomic device includes a body having a first curved side, and a second curved side opposite to the first curved side and to be adjacent to the writing instrument. The ergonomic device also includes a first arm between the first curved side and the second curved side and extending outwardly from the body. The first arm defines a first opening to receive an index finger and a middle finger of a user. The ergonomic device includes a second arm between the first curved side and the second curved side and opposite to the first arm. The second arm extends outwardly from the body and defines a second opening to receive a thumb of the user.

20 Claims, 16 Drawing Sheets

(56) References Cited

U.S. PATENT DOCUMENTS

| | | | |
|---|---|---|---|
| 9,205,696 B2 * | 12/2015 | Young | B43K 23/012 |
| D863,438 S * | 10/2019 | Chen | D19/203 |
| 10,946,690 B1 * | 3/2021 | Kruger | F16B 1/00 |
| 11,203,222 B2 | 12/2021 | Kaiser et al. | |
| 11,331,784 B2 | 5/2022 | Dyer | |
| 11,872,712 B2 * | 1/2024 | Lichtblau | B26B 21/527 |
| 2006/0039739 A1 | 2/2006 | Komorowski | |
| 2007/0196158 A1 | 8/2007 | Roche et al. | |
| 2014/0348564 A1 | 11/2014 | Vleisides et al. | |
| 2014/0369732 A1 | 12/2014 | Chen | |
| 2015/0064665 A1 * | 3/2015 | Hunt | G09B 11/02 |
| | | | 434/166 |
| 2015/0279229 A1 * | 10/2015 | Padden | G09B 11/02 |
| | | | 434/166 |
| 2022/0281261 A1 | 9/2022 | Rackley et al. | |

\* cited by examiner

ERGONOMIC DEVICE FOR WRITING INSTRUMENT AND RELATED METHODS

RELATED APPLICATION

This application is a continuation-in-part of prior filed copending Application No. 30/006,269 filed May 30, 2025, the entire subject matter of which is incorporated herein by reference in its entirety.

TECHNICAL FIELD

The present disclosure relates to the field of writing instrument accessories, and, more particularly, to ergonomic devices for writing instruments and related methods.

BACKGROUND

The ergonomic device industry is both robust and diverse. From task chairs to wrist/keyboard devices for typing, there is a wide range of products that encourage proper form and high productivity. Indeed, ergonomic devices are available for many repetitive activities, for example, handwriting.

Some approaches to ergonomic devices for writing instruments comprise a sleeve that fits over the writing instrument. Although these devices are inexpensive, they alter the shape of the writing tool, and the user holds the device rather than the tool. The currently available sleeve devices may not prevent improper hand formation; therefore, this may allow dysfunctional patterns to persist. Additionally, the sleeve type devices may be designed to be fitted to one writing instrument at a time and only accommodate certain shaft dimensions. Therefore, this may disallow the use of a multitude of writing tools available for the task.

SUMMARY

Generally, an ergonomic device is for a writing instrument. The ergonomic device comprises a body comprising a first curved side, and a second curved side opposite to the first curved side and to be adjacent to the writing instrument. The ergonomic device also includes a first arm between the first curved side and the second curved side and extending outwardly from the body. The first arm defines a first opening to receive an index finger and a middle finger of a user. The ergonomic device includes a second arm between the first curved side and the second curved side and opposite to the first arm. The second arm extends outwardly from the body and defines a second opening to receive a thumb of the user. For example, the first opening may comprise an elongate-oval-shaped opening, and the second opening may comprise a round-shaped opening. The first arm and the second arm define a recess above the upper surface for receiving the writing instrument. The index finger, the middle finger, and the thumb are to grasp the writing instrument and position it freely through the recess.

More specifically, the first opening may be larger than the second opening. The body may comprise a surface being transverse to and being between the first curved side and the second curved side. The surface may comprise a flat surface in some embodiments. The surface may comprise a first slot adjacent to the first curved side, and a second slot opposite to the first slot and adjacent to the second curved side. The surface may comprise a closed passageway to receive the writing instrument. For example, the closed passageway may be round-shaped.

Furthermore, the first arm may comprise a first segment and a second segment opposite to the first segment. The first segment has a first curved end, a second curved end, and a medial portion between the first curved end and the second curved end. The medial portion may protrude inwardly into the first opening.

Another aspect is directed to a method for making an ergonomic device for a writing instrument. The method comprises forming a body comprising a first curved side, and a second curved side opposite to the first curved side and to be adjacent to the writing instrument, and forming a first arm between the first curved side and the second curved side and extending outwardly from the body. The first arm defines a first opening to receive an index finger and a middle finger of a user. The method also includes forming a second arm between the first curved side and the second curved side and opposite to the first arm. The second arm extends outwardly from the body and defines a second opening to receive a thumb of the user. In some embodiments, the forming of the body, the forming of the first arm, and the forming of the second arm may be performed integrally in a single step.

DETAILED DESCRIPTION

Figure 1:
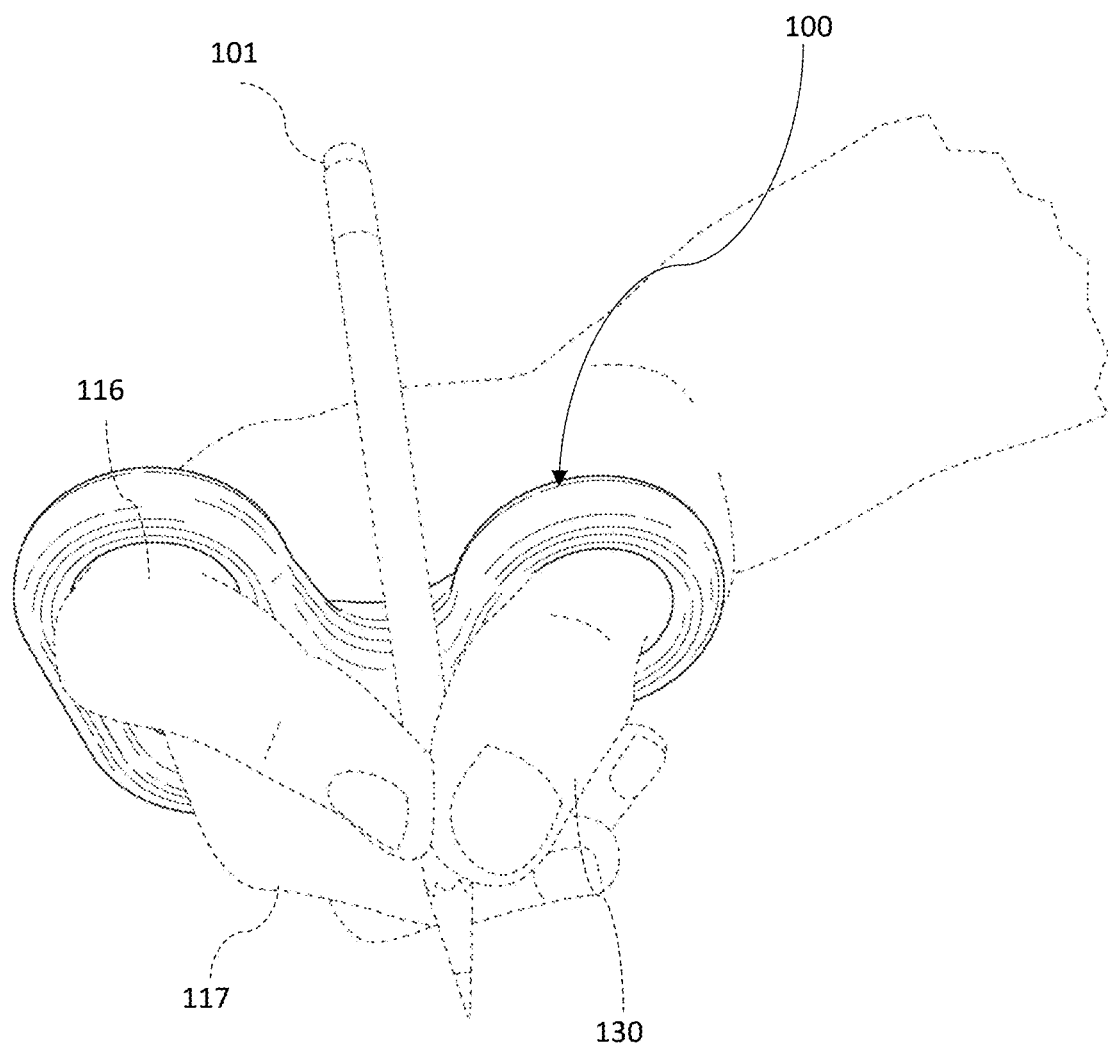
FIG. 1 is a perspective view of an ergonomic device and a writing instrument, according to a first embodiment of the present disclosure.
Figure 2:
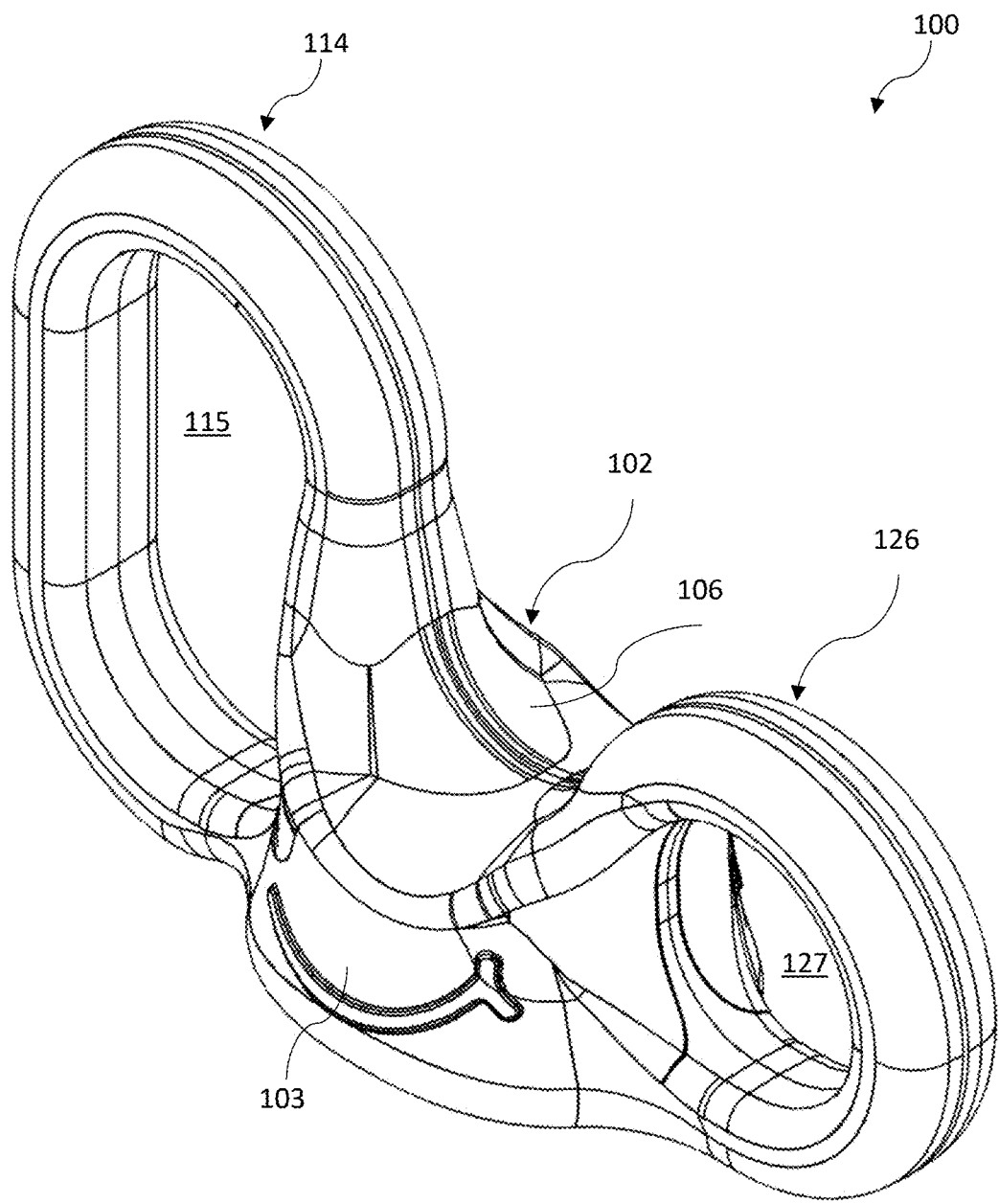
FIG. 2 is a perspective view of the ergonomic device of FIG. 1.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring to FIGS. 1-3, 4A-4B, & 5, an ergonomic device 100 according to the present disclosure is now described. The ergonomic device 100 is illustratively used in combination with any writing instrument 101, regardless of the instrument's thickness or shape (e.g., a pencil, marker, crayon or pen). As will be appreciated, the ergonomic device 100 may provide for proper hand positioning and formation while using the writing instrument 101. In contrast to existing approaches, the ergonomic device 100 corrects hand positioning and formation allowing the user direct contact with the writing tool as it is designed rather than altering constitution and the dimensions of the writing instrument. The existing approaches may create a contact barrier which diminishes sensory (e.g., pressure applied, vibration, and drag friction) feedback from the writing tool and prevents learning manipulation of the tool as it is designed. The existing sleeve type devices are easily avoided allowing for persistent immature, dysfunctional patterns of pinch grasp and manipulation.

The ergonomic device 100 comprises a body 102 comprising a first curved side 103, and a second curved side 104 opposite to the first curved side and to be adjacent to the writing instrument 101 (FIG. 1). The body 102 also includes a lower surface 105 being transverse to and being between the first curved side 103 and the second curved side 104, and an upper surface 106 opposite to the lower surface, and being transverse to and being between the first curved side and the second curved side.

Figure 5:
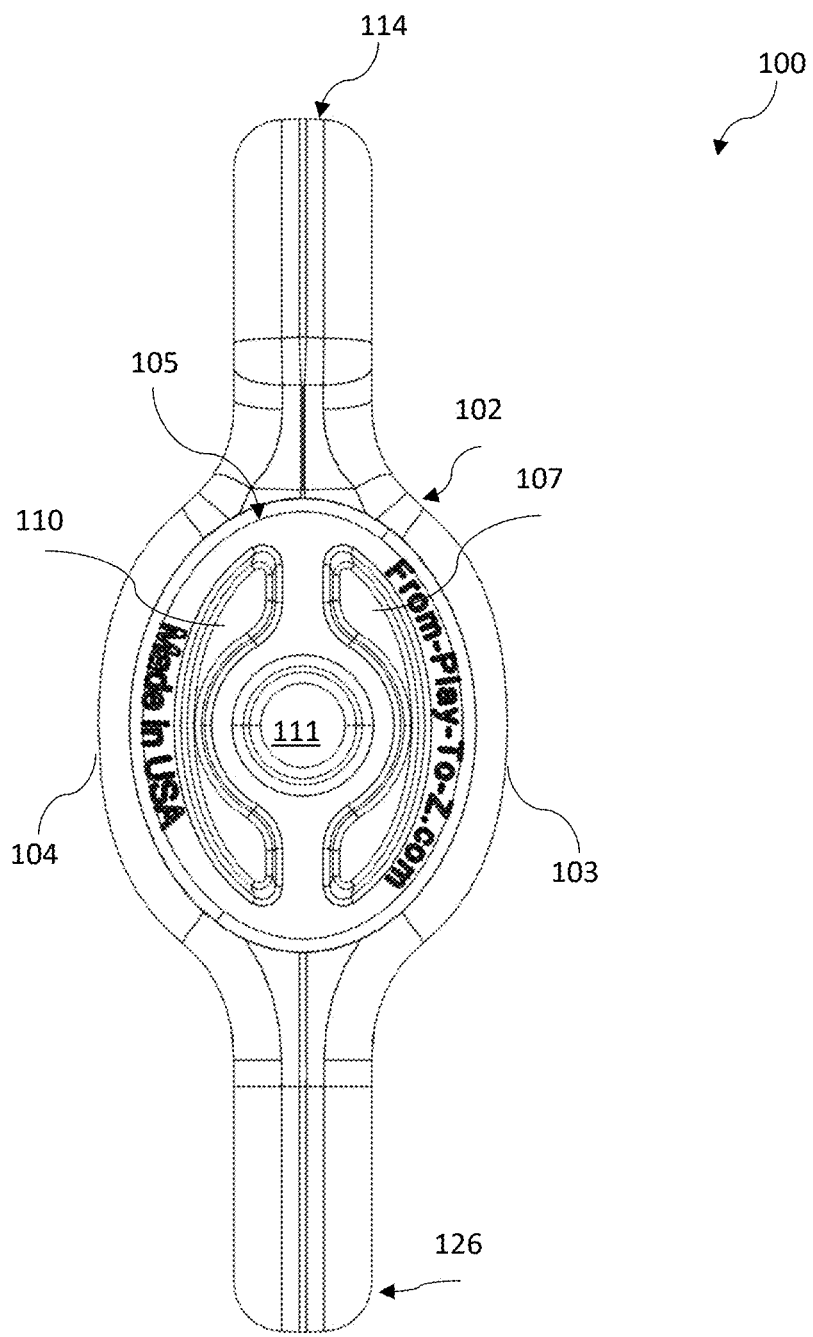
FIG. 5 is a bottom plan view of the ergonomic device of FIG. 1.

As shown in FIG. 5, the lower surface 105 illustratively comprises a flat surface or substantially flat surface (i.e., an I-unit value flatness of 0.4 or less), and radiused peripheral edges leading into the first and second curved sides 103, 104, which may provide for a more comfortable grip for the user. Helpfully, when the ergonomic device 100 is not in use, the user may rest the ergonomic device onto a tabletop via the lower surface 105.

The lower surface 105 illustratively comprises a first slot 107 adjacent to the first curved side 103, and a second slot 110 opposite to the first slot and adjacent to the second curved side 104. The first slot 107 and the second slot 110 are illustratively symmetrical in pattern, and each comprises a C-shaped slot with distal ends having a thickness greater than that of a medial portion between the distal ends. As will be appreciated, when the ergonomic device 100 is integrally formed with injection molding processes, the first slot 107 and the second slot 110 may reduce material costs and permit the workpiece to cool rapidly and without deformation.

The lower surface 105 comprises a closed passageway 111 to receive the writing instrument 101. The closed passageway 111 is flanked on both sides respectively by the first slot 107 and the second slot 110. In particular, when the ergonomic device 100 is not being used, the user can install the ergonomic device onto an end (e.g., the eraser of a pencil) of the writing instrument 101 by inserting one end of the writing instrument into the closed passageway 111. In the illustrated embodiment, the closed passageway 111 is circle-shaped, but may be round-shaped in other embodiments. Of course, the closed passageway 111 may also take on other polygonal shapes so long as the inner walls of the closed passageway frictionally lock onto adjacent portions of the writing instrument 101. Further, the lower surface 105 is oval-shaped, but may be polygonal shaped in other embodiments.

Figure 4A:
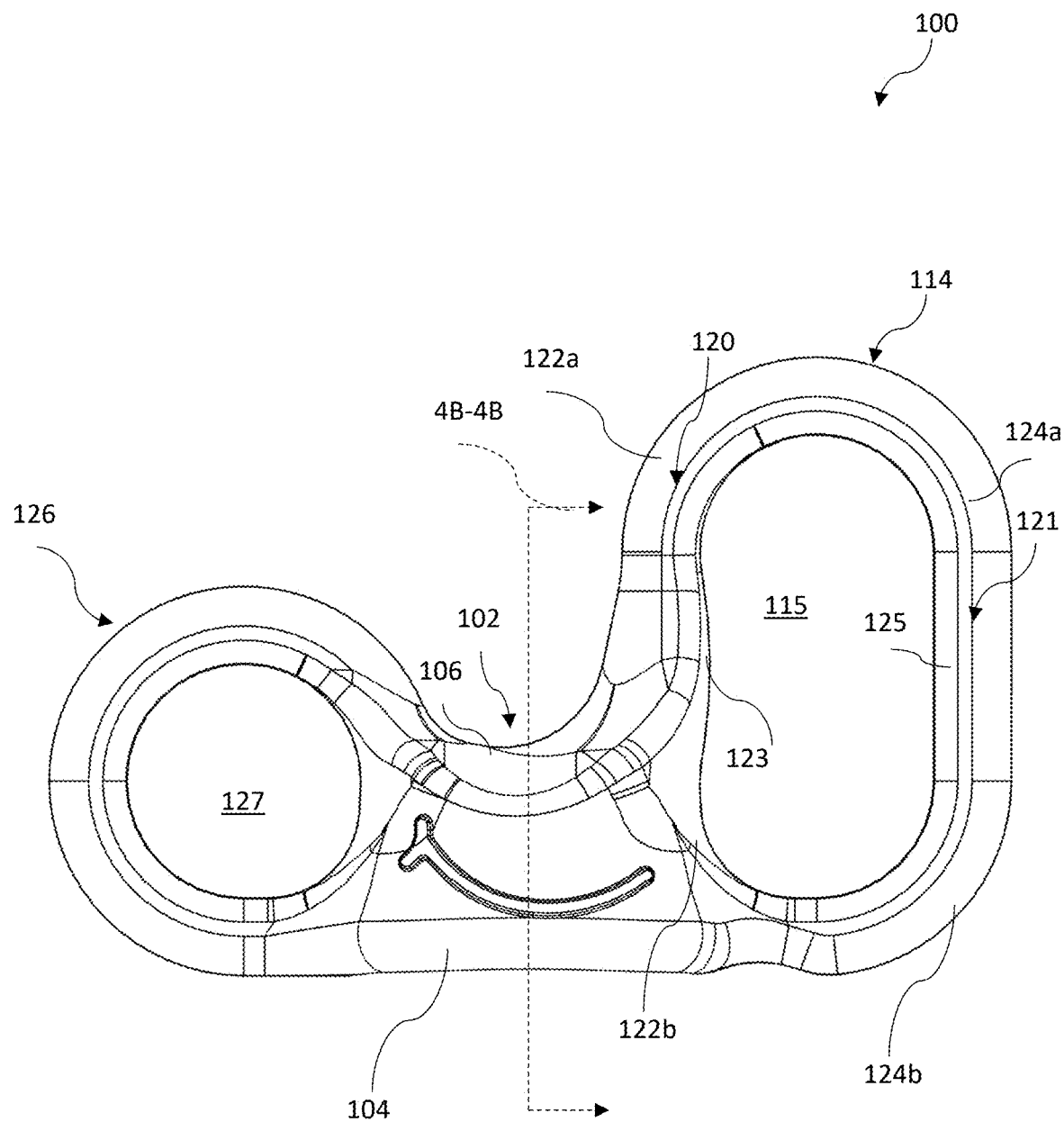
FIG. 4A is a rear plan view of the ergonomic device of FIG. 1.
Figure 4B:
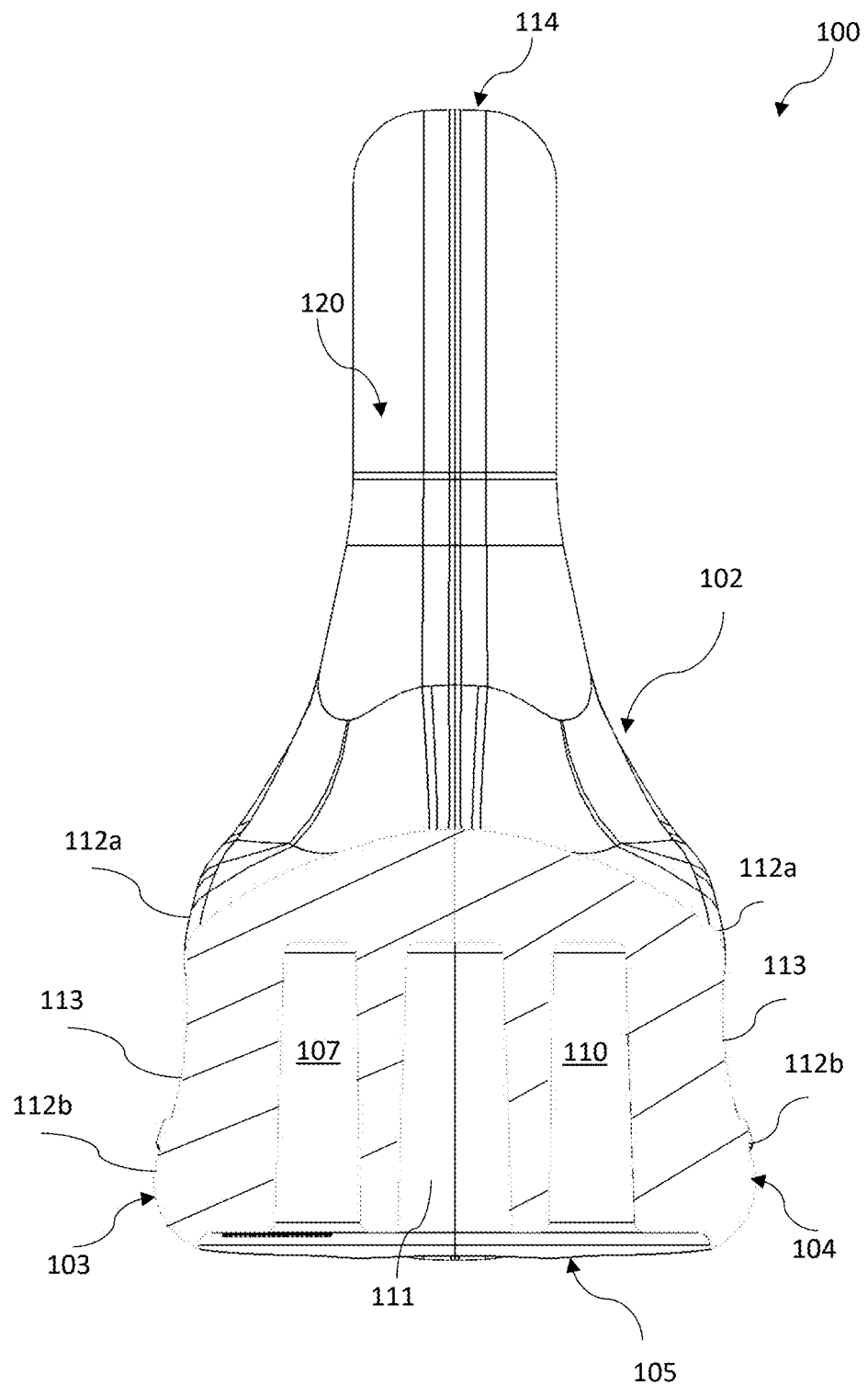
FIG. 4B is a cross-sectional view of the ergonomic device of FIG. 1 along line 4B-4B of FIG. 4A.

As perhaps best seen in FIG. 4B, each of the first and second curved sides 103, 104 comprises first and second outward protrusions 112a-112b, and a medial recess 113 between the first and second outward protrusions. Further, the closed passageway 111 has a progressively reducing width as it proceeds inward to ensure a solid friction lock with the writing instrument 101. Also, the first slot 107 and the second slot 110 each has similar reducing widths as they proceed inwardly.

The ergonomic device 100 also includes a first arm 114 between the first curved side 103 and the second curved side 104 and extending outwardly and upwardly from the body 102. The first arm 114 defines a first opening 115 to receive an index finger 116 and a middle finger 117 of a user. Furthermore, the first arm 114 illustratively comprises a first segment 120, and a second segment 121 opposite to the first segment. The first segment 120 has a first curved end 122a, a second curved end 122b opposite the first curved end, and a medial portion 123 between the first curved end and the second curved end. The medial portion 123 protrudes inwardly into the first opening 115 (providing a placement guidance for the index finger 116 and the middle finger 117). In the illustrated embodiment, the first opening 115 comprises an elongate-oval-shaped opening. The second segment 121 illustratively includes a first curved end 124a, a second curved end 124b opposite to the first curved end, and a flat medial portion (or substantially flat, i.e., an I-unit flatness value of 0.4 or less) 125 between the first curved end and the second curved end.

The ergonomic device 100 includes a second arm 126 between the first curved side 103 and the second curved side 104 and opposite to the first arm 114. The second arm 126 extends outwardly and upwardly from the body 102 and defines a second opening 127 to receive a thumb 130 of the user. The second opening 127 illustratively includes a circle-shaped opening, but may comprise a round-shaped opening or a polygonal-shaped opening in other embodiments.

Figure 3:
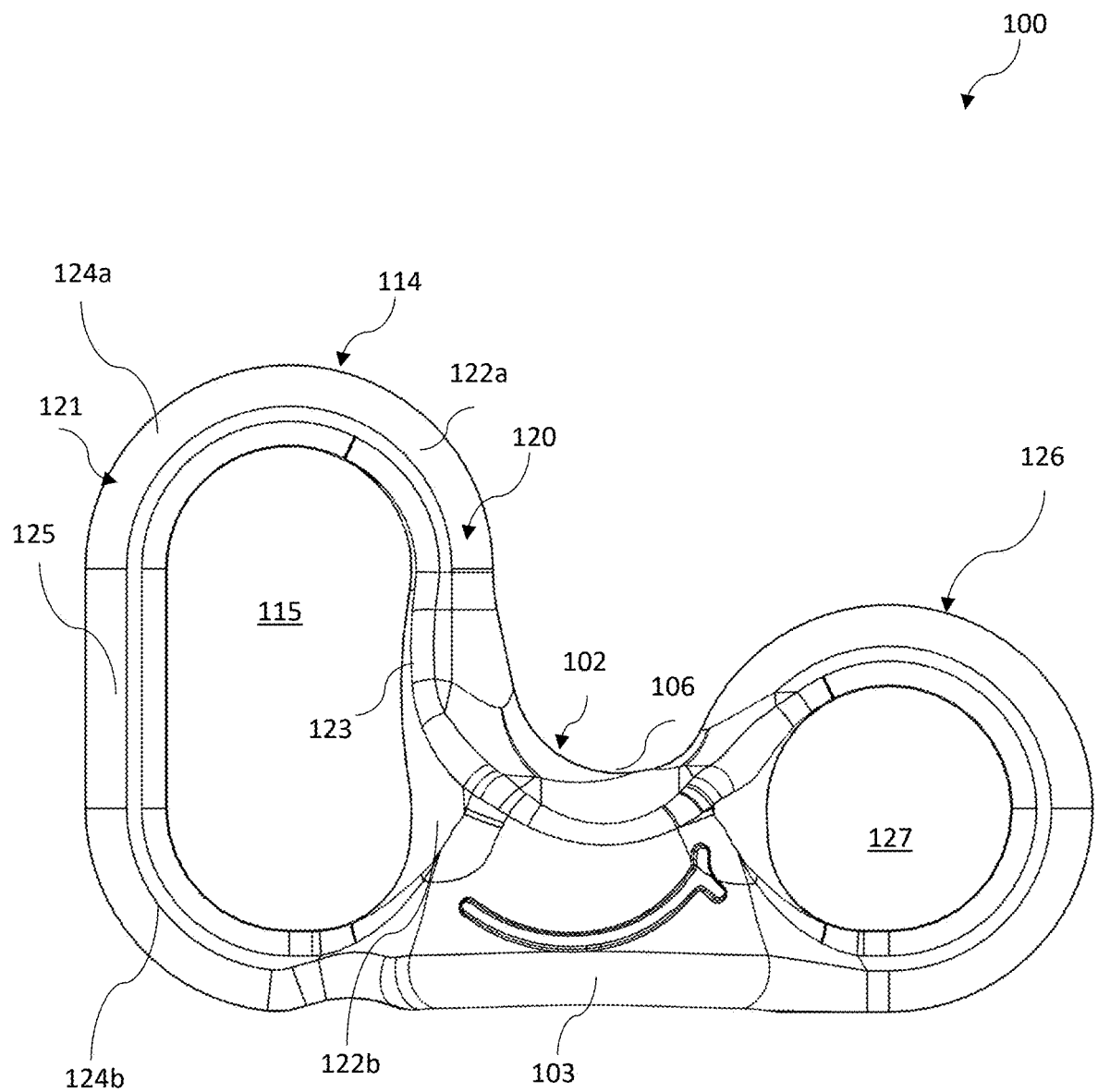
FIG. 3 is a front plan view of the ergonomic device of FIG. 1.

Further, as perhaps best seen in FIGS. 3 & 4, the first opening 115 is larger than the second opening 127 and extends upwardly to a greater height than the second opening. The upper surface 106 also defines an inwardly bending curve between the first arm 114 and the second arm 126.

Another aspect is directed to a method for making an ergonomic device 100 for a writing instrument 101. The method comprises forming a body 102 comprising a first curved side 103, and a second curved side 104 opposite to the first curved side and to be adjacent to the writing instrument, and forming a first arm 114 between the first curved side and the second curved side and extending outwardly from the body. The first arm 114 defines a first opening 115 to receive an index finger 116 and a middle finger 117 of a user. The method also includes forming a second arm 126 between the first curved side 103 and the second curved side 104 and opposite to the first arm 114. The second arm 126 extends outwardly from the body 102 and defines a second opening 127 to receive a thumb 130 of the user.

In some embodiments, the forming of the body 102, the forming of the first arm 114, and the forming of the second arm 126 may be performed integrally in a single step. For example, the integral forming of these components may comprise an injection molding process. Each of the body 102, the first arm 114, and the second arm 126 may comprise a material with sufficient memoryless deformability for user comfort, for example, a soft plastic or foam material.

As will be appreciated, the user would first insert the thumb 130 through the second opening 127 and the index and middle fingers 116, 117 into the first opening 115. Then, the user would grip the writing instrument 101 in typical fashion. Advantageously, the ergonomic device 100 guides the user to have proper hand position and formation. Further, due to the soft/flexible material of the ergonomic device 100, the user's hand will be less fatigued during long writing sessions.

Figure 6:
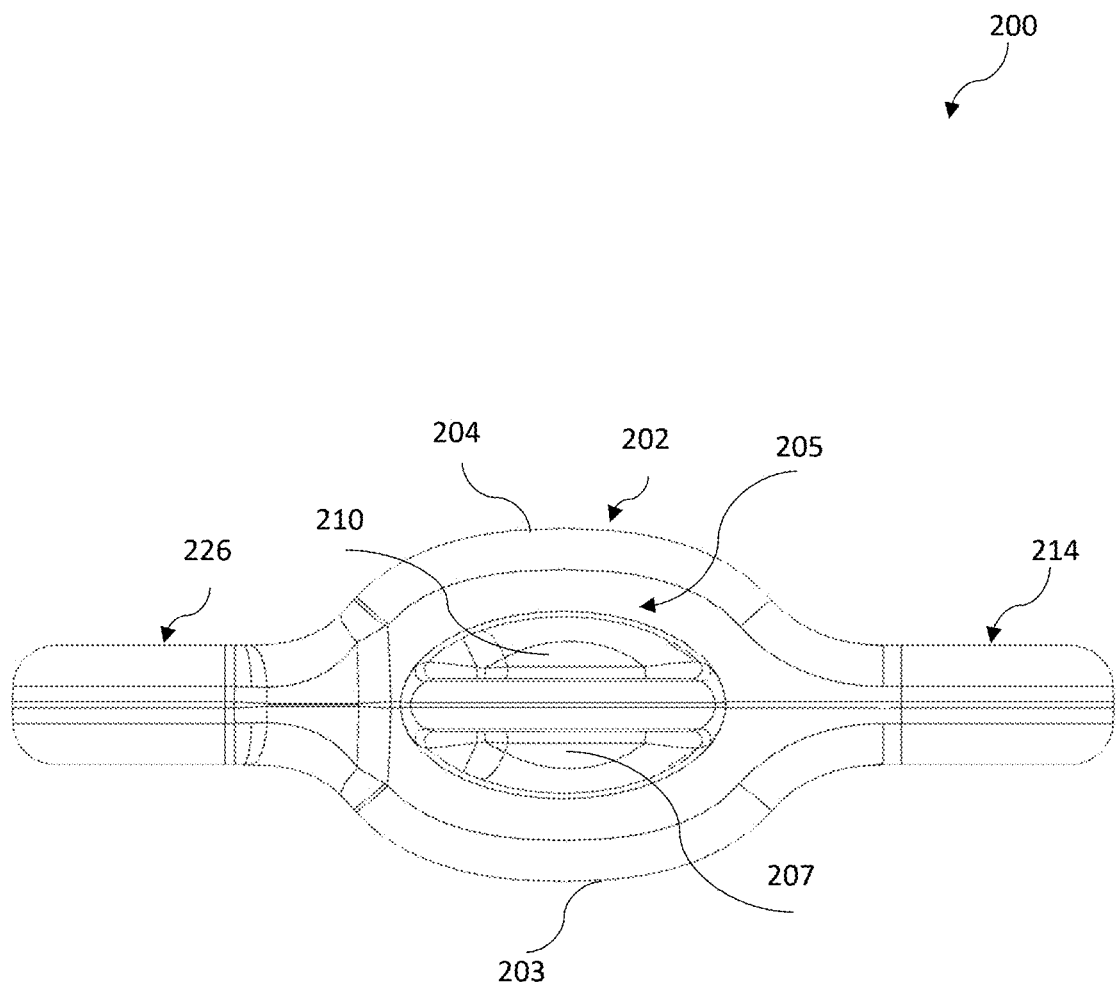
FIG. 6 is a bottom plan view of the ergonomic device, according to a second embodiment of the present disclosure.

Referring now additionally to FIG. 6, another embodiment of the ergonomic device 200 is now described. In this embodiment of the ergonomic device 200, those elements already discussed above with respect to FIGS. 1-5 are incremented by 100 and most require no further discussion herein. This embodiment differs from the previous embodiment in that this ergonomic device 200 illustratively includes the lower surface 205 comprising a first slot 207 adjacent to the first curved side 203, and a second slot 210 opposite to the first slot and adjacent to the second curved side 204. Here, the closed passageway 111 from the prior embodiment (FIGS. 1-5) is omitted, and the first slot 207 and the second slot 210 are both symmetrical and substantially crescent-shaped (i.e., a portion of a circle).

Figure 7A:
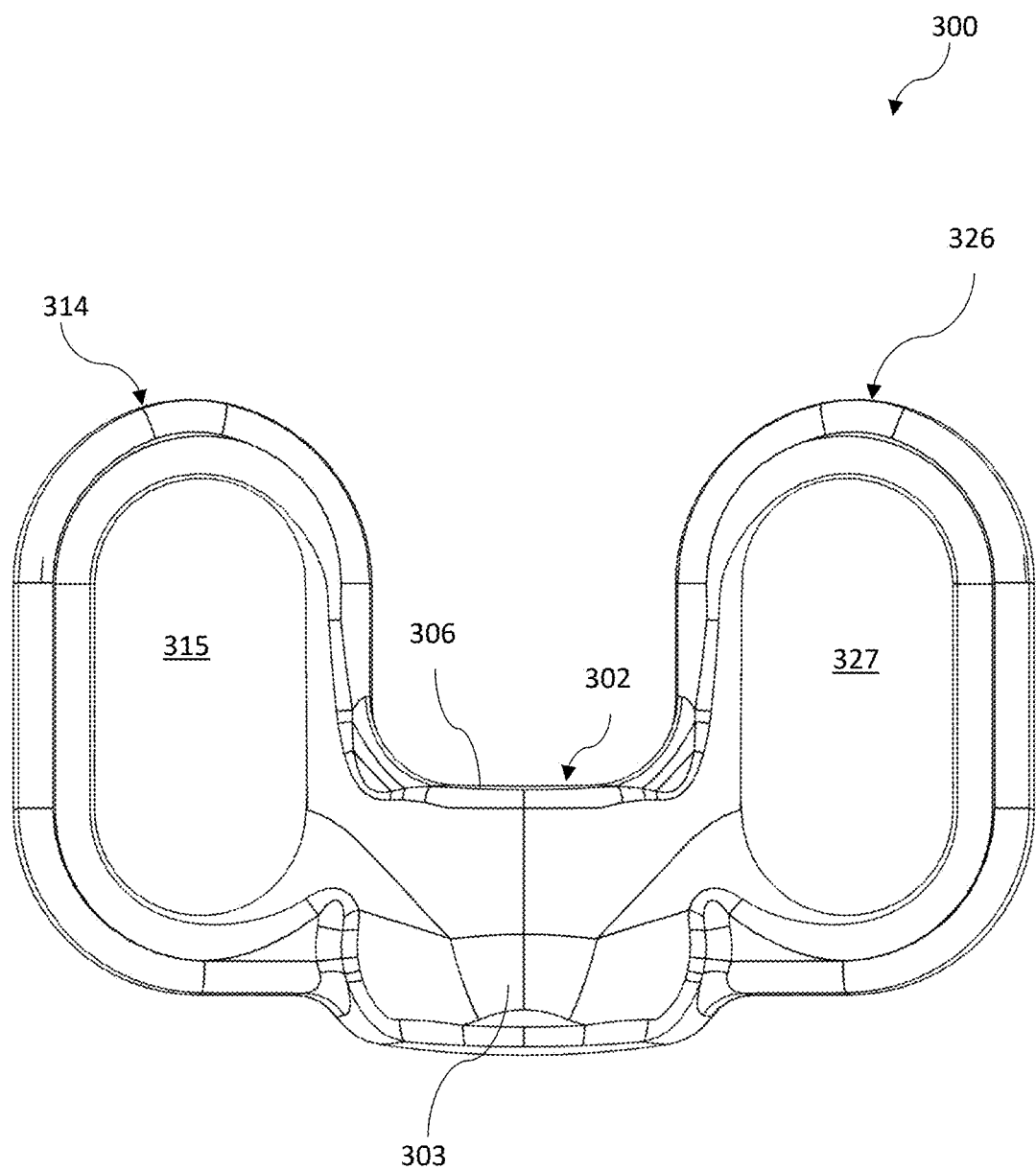
FIG. 7A is a front plan view of the ergonomic device, according to a third embodiment of the present disclosure.
Figure 7B:
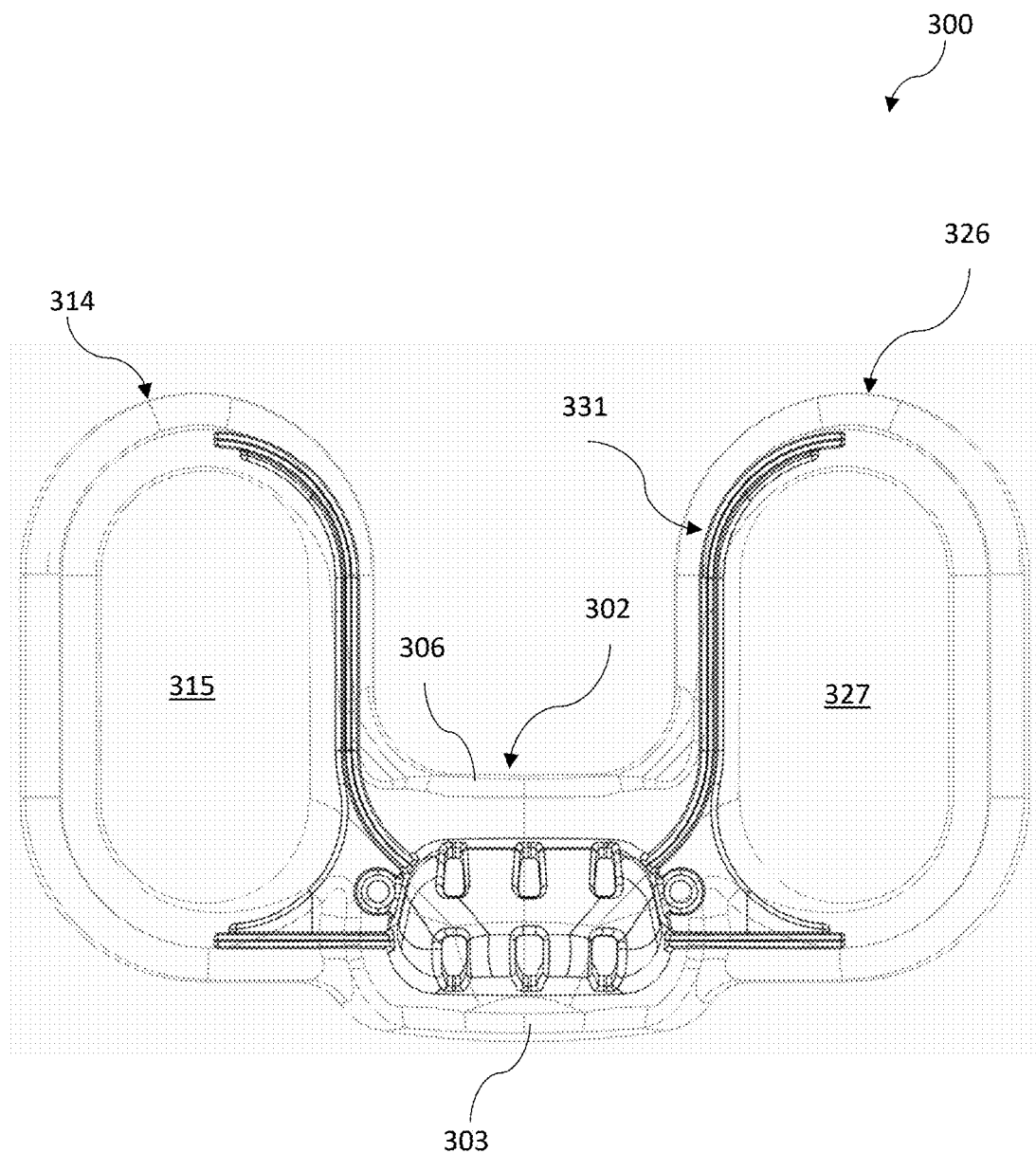
FIG. 7B is a front plan view of the ergonomic device of FIG. 7A with the body being partially transparent.
Figure 7C:
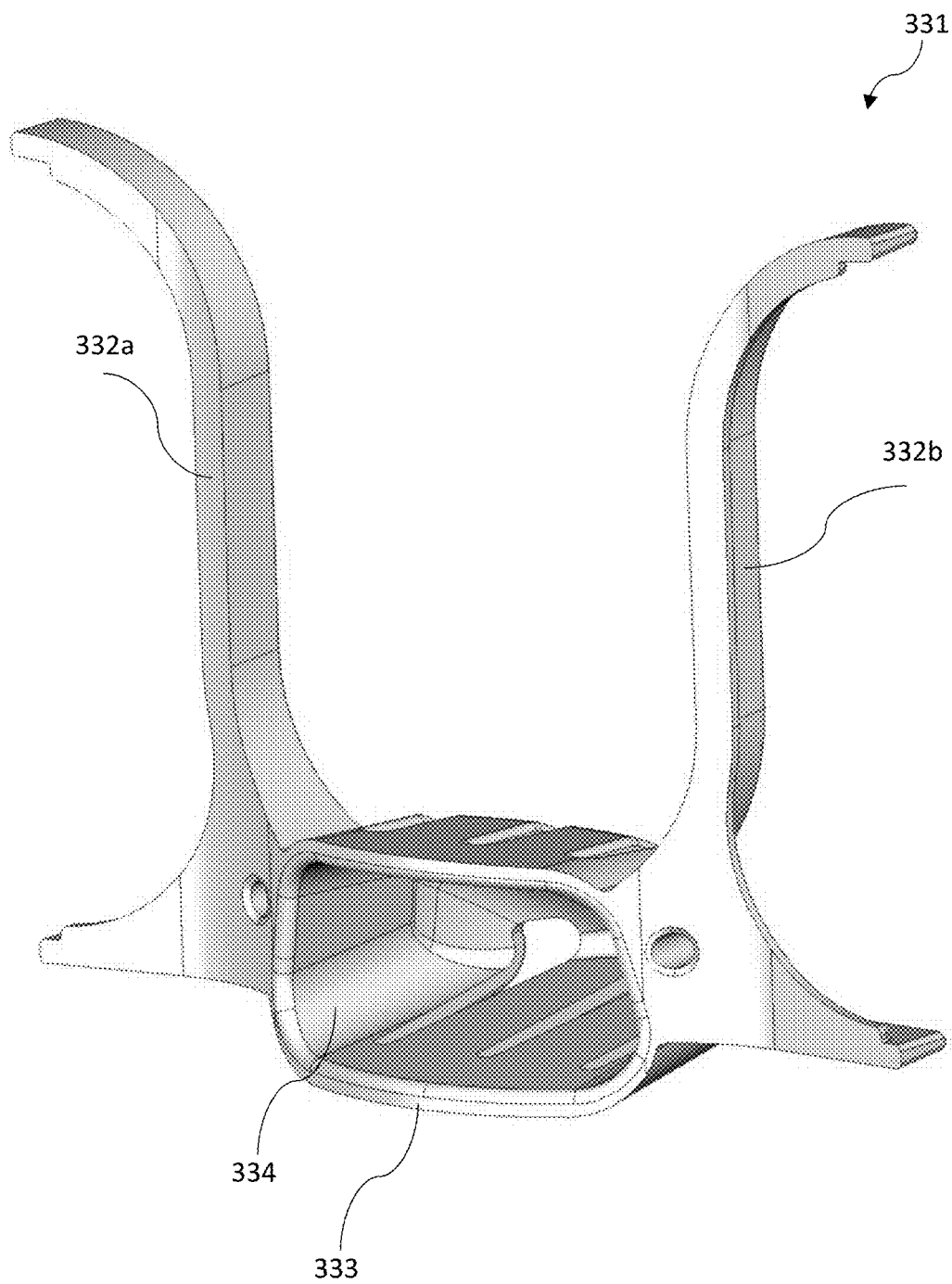
FIGS. 7C & 7D are perspective views of an internal support structure for the ergonomic device of FIG. 7A.
Figure 7D:
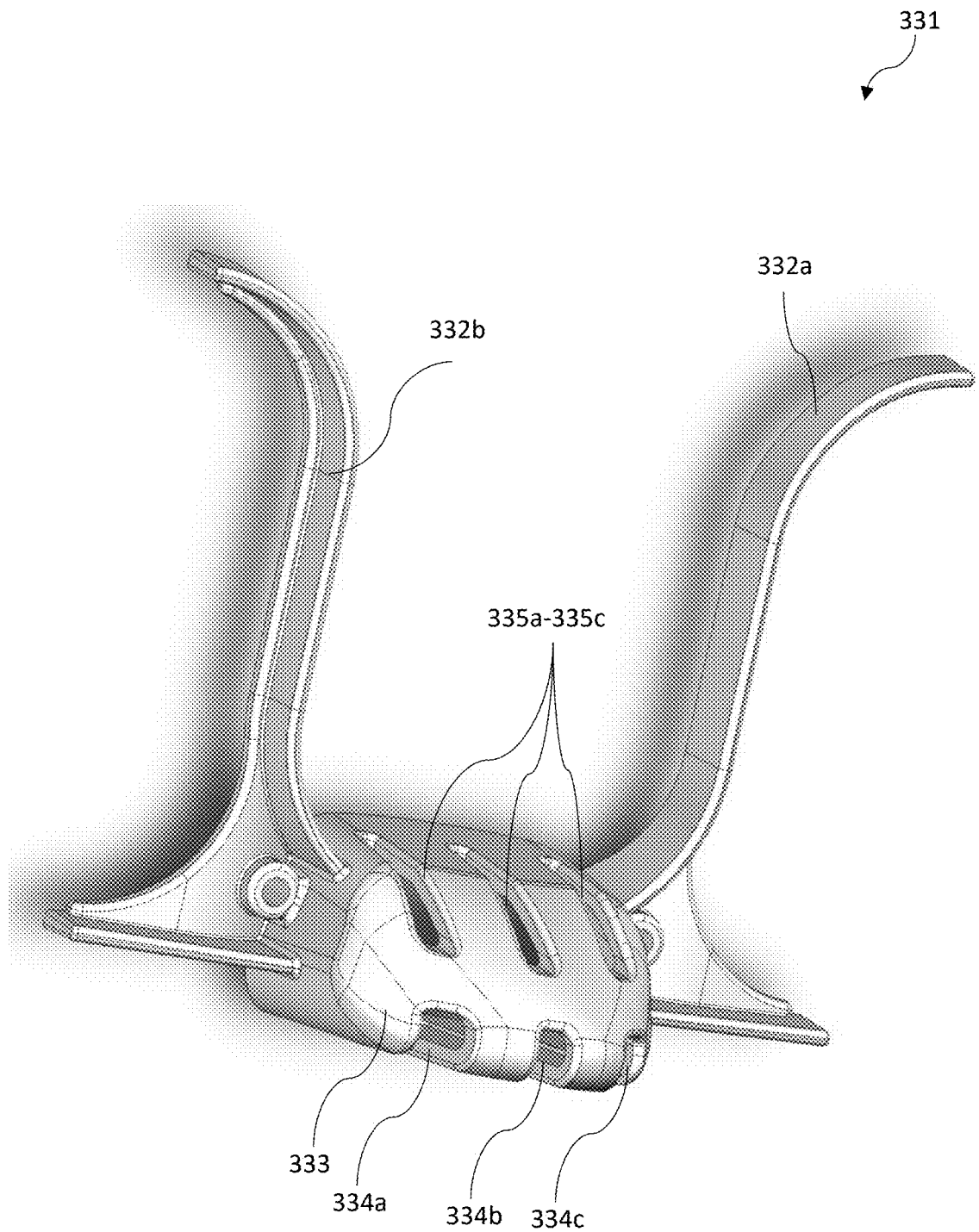
Figure 8:
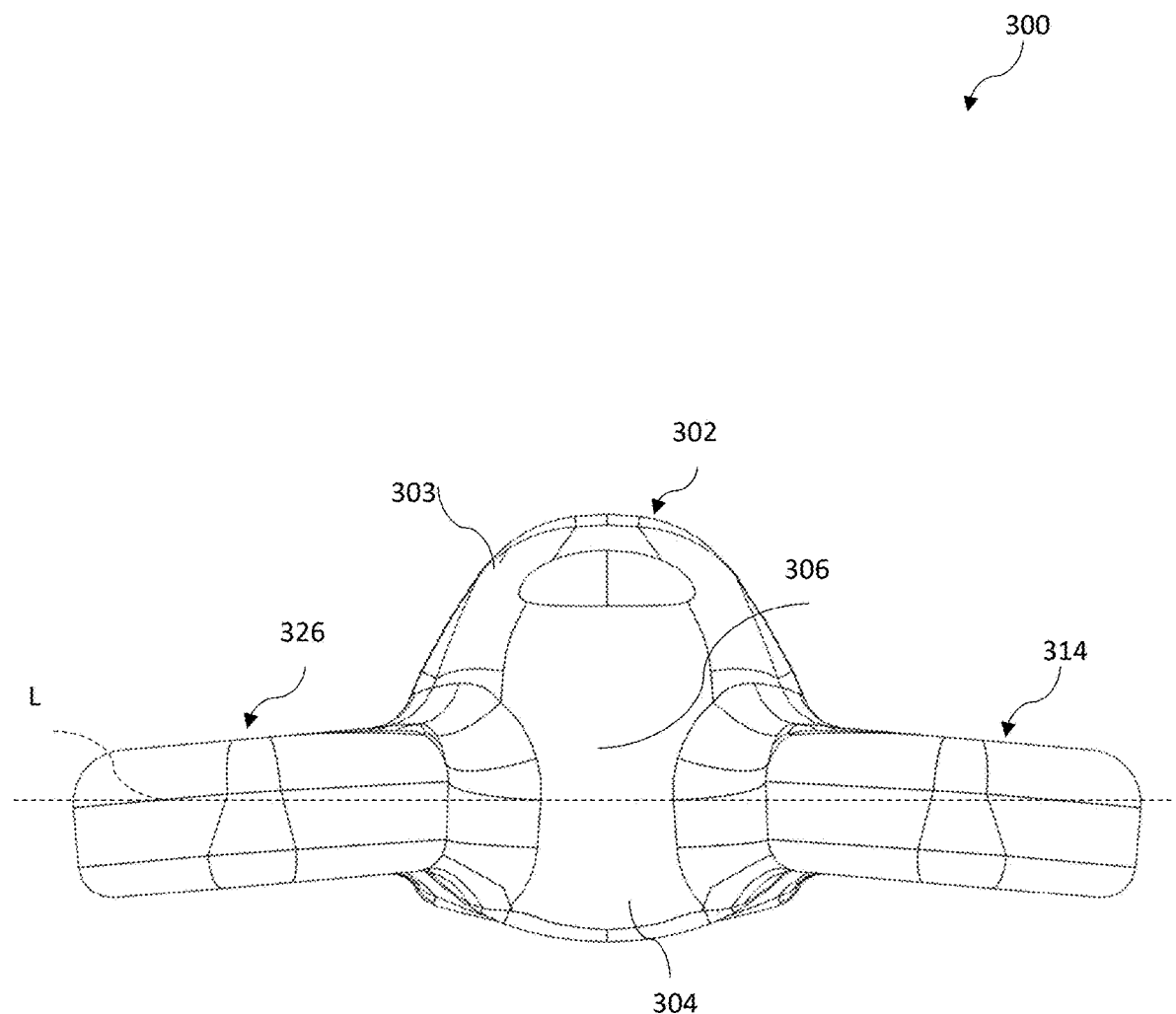
FIG. 8 is a top plan view of the ergonomic device of FIG. 7A.

Referring now additionally to FIGS. 7A-7D & 8, another embodiment of the ergonomic device 300 is now described. In this embodiment of the ergonomic device 300, those elements already discussed above with respect to FIGS. 1-5 are incremented by 200 and most require no further discussion herein. This embodiment differs from the previous embodiment in that this ergonomic device 300 illustratively includes the first opening 315 and the second opening 327 having identical elongate-oval shapes. Further, the first and second arms 314, 326 are canted with respect to a longitudinal axis L (FIG. 8). In this illustrated embodiment, the first and second arms 314, 326 are canted with respect to the longitudinal axis L by 4°, but this may range between 1° and 15°. Also, as perhaps best seen in FIG. 8, the first curved side 303 protrudes laterally outward more than the second curved side 304.

As perhaps best seen in FIGS. 7B-7D, the ergonomic device 300 illustratively includes an internal support structure 331. The internal support structure 331 illustratively includes first and second arms 332a-332b, and a medial portion 333 between the first and second arms. The medial portion 333 illustratively includes a rearward facing recess 334, and first and second frontward facing sets of slots 334a-334c, 335a-335c.

Figure 9:
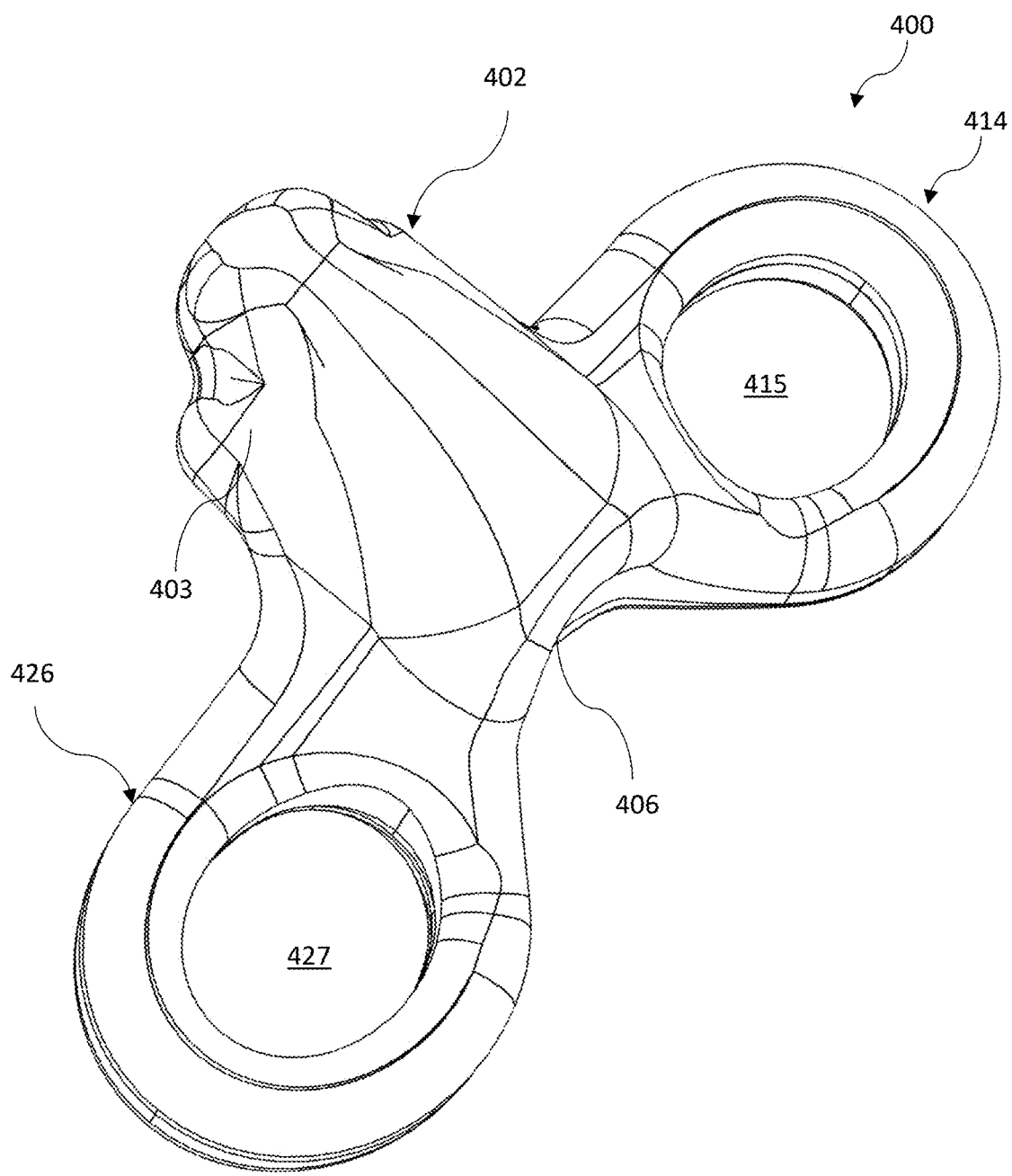
FIG. 9 is a perspective view of the ergonomic device, according to a fourth embodiment of the present disclosure.
Figure 10:
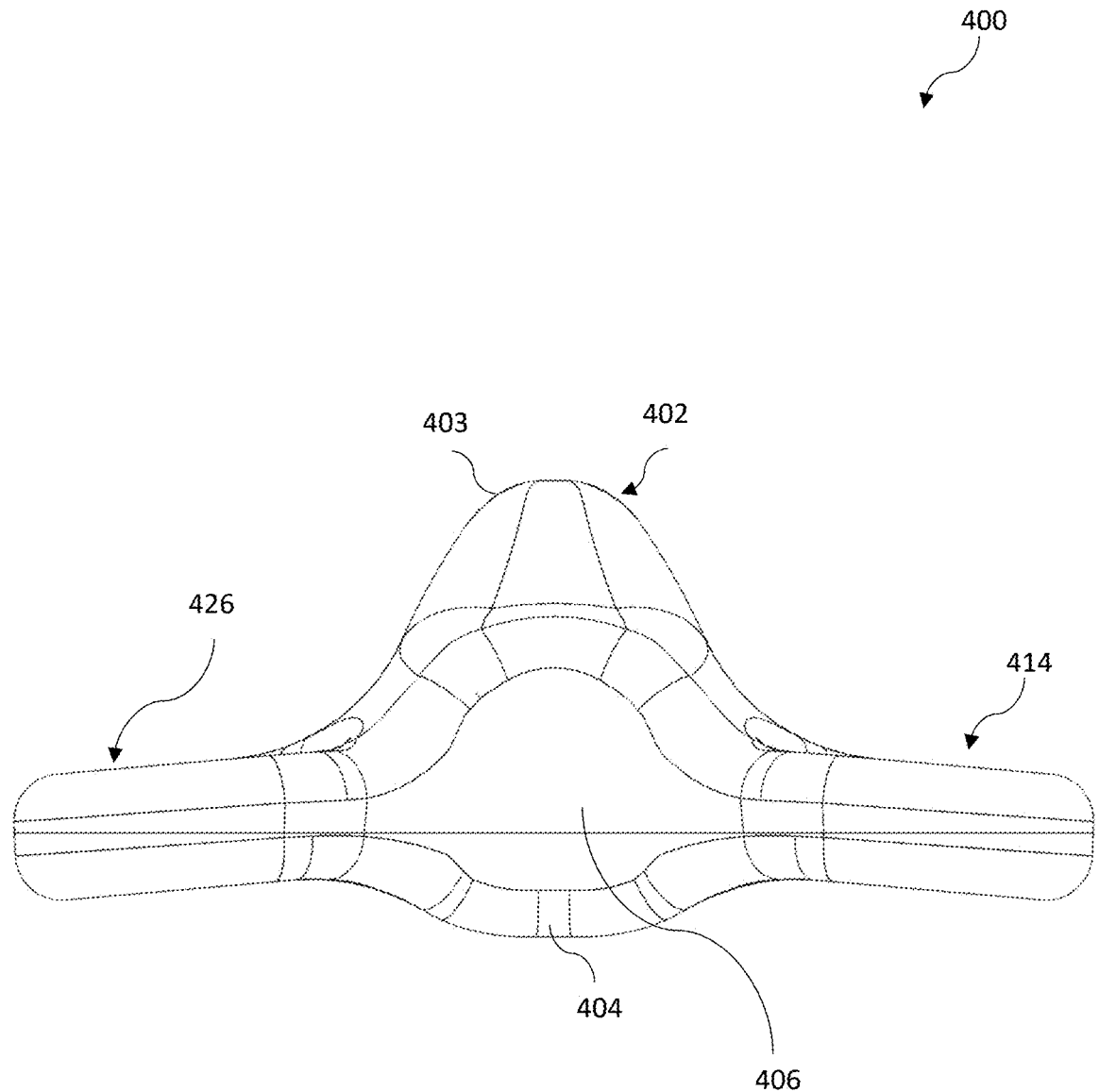
FIG. 10 is a top plan view of the ergonomic device of FIG. 9.

Referring now additionally to FIGS. 9-10, another embodiment of the ergonomic device 400 is now described. In this embodiment of the ergonomic device 400, those elements already discussed above with respect to FIGS. 1-5 are incremented by 300 and most require no further discussion herein. This embodiment differs from the previous embodiment in that this ergonomic device 400 illustratively includes the first opening 415 and the second opening 427 having identical round/circle shapes. Further, the first and second arms 414, 426 are canted with respect to a longitudinal axis (not shown) in a fashion similar to the embodiment of FIGS. 7-8. Also, as perhaps best seen in FIG. 10, the first curved side 403 protrudes outward laterally more than the second curved side 404. Also, the distal end of the first curved side 403 has a progressively reducing width to define a "pistol grip" for a hand of the user. In particular, the ring finger and the pinky finger of the user would wrap this "pistol grip".

Figure 11:
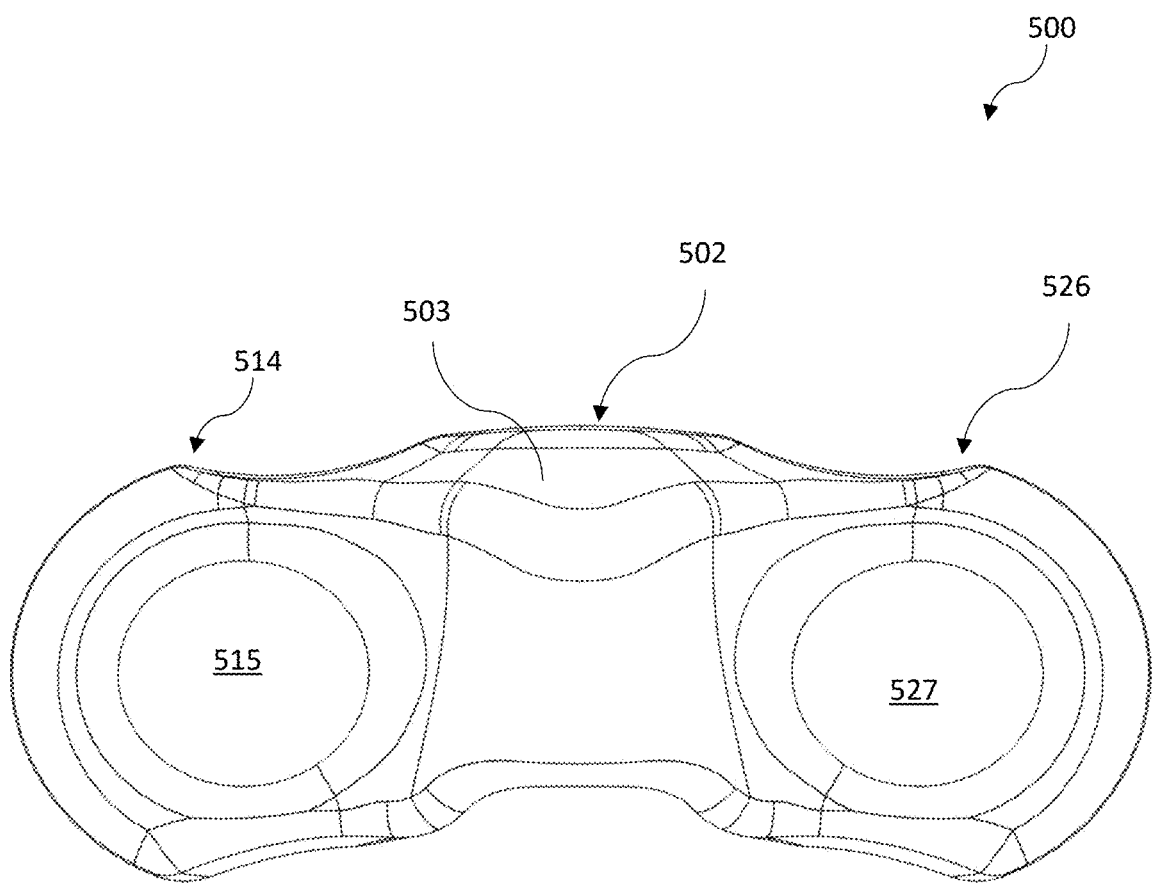
FIG. 11 is a front plan view of the ergonomic device, according to a fifth embodiment of the present disclosure.
Figure 12:
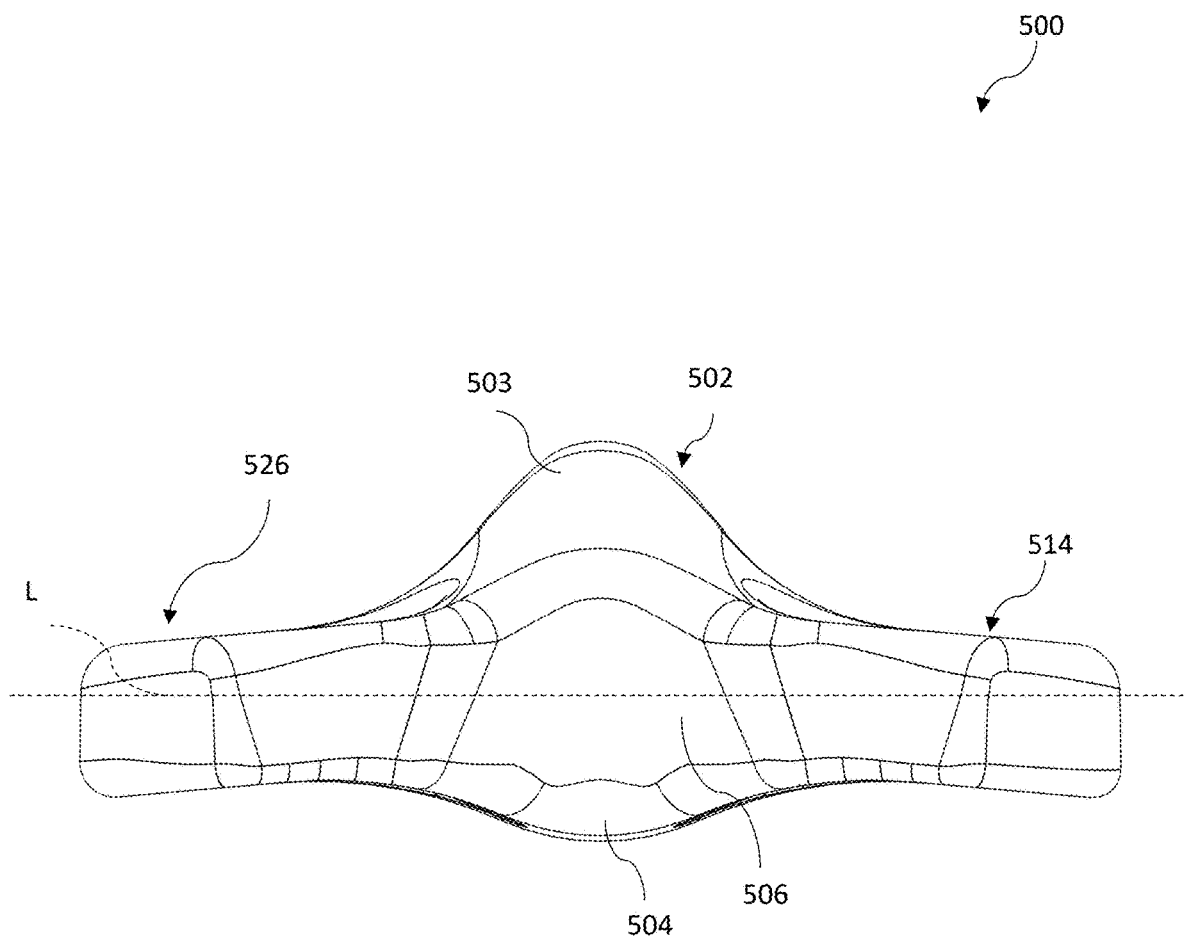
FIG. 12 is a top plan view of the ergonomic device of FIG. 11.

Referring now additionally to FIGS. 11-12, another embodiment of the ergonomic device 500 is now described. In this embodiment of the ergonomic device 500, those elements already discussed above with respect to FIGS. 1-5 are incremented by 400 and most require no further discussion herein. This embodiment differs from the previous embodiment in that this ergonomic device 500 illustratively includes the first opening 515 and the second opening 527 having identical round/circle shapes. Further, the first and second arms 514, 526 are canted with respect to a longitudinal axis L, and protrude less upward than in prior embodiments. In this illustrated embodiment, the first and second arms 514, 526 are canted with respect to the longitudinal axis L by 3°, but this may range between 1° and 15°. Also, as perhaps best seen in FIG. 12, the first curved side 503 protrudes outward laterally more than the second curved side 504.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An ergonomic device for a writing instrument, the ergonomic device comprising:
    a body comprising
        a first curved side,
        a second curved side opposite to the first curved side,
        a lower surface being transverse to and being between the first curved side and the second curved side, and
        an upper surface opposite to the lower surface;
    a first arm between the first curved side and the second curved side and extending outwardly from the body, the first arm defining a first opening to receive an index finger and a middle finger of a user; and
    a second arm between the first curved side and the second curved side and opposite to the first arm, the second arm extending outwardly from the body and defining a second opening to receive a thumb of the user, the first arm and the second arm defining a recess above the upper surface for receiving the writing instrument;
    the index finger, the middle finger, and the thumb to grasp the writing instrument and position it freely through the recess.

2. The ergonomic device of claim 1 wherein the first opening is larger than the second opening.

3. The ergonomic device of claim 1 wherein the lower surface comprises a flat surface.

4. The ergonomic device of claim 1 wherein the lower surface comprises a first slot adjacent to the first curved side, and a second slot opposite to the first slot and adjacent to the second curved side.

5. The ergonomic device of claim 1 wherein the lower surface comprises a closed passageway to receive the writing instrument.

6. The ergonomic device of claim 5 wherein the closed passageway is round-shaped.

7. The ergonomic device of claim 1 wherein the first arm comprises a first segment and a second segment opposite to the first segment, the first segment having a first curved end, a second curved end, and a medial portion between the first curved end and the second curved end, the medial portion protruding inwardly into the first opening.

8. The ergonomic device of claim 1 wherein the second opening comprises a round-shaped opening.

9. The ergonomic device of claim 1 wherein the first opening comprises an elongate-oval-shaped opening.

10. A method for making an ergonomic device for a writing instrument, the method comprising:
    forming a body comprising
        a first curved side,
        a second curved side opposite to the first curved side,
        a lower surface being transverse to and being between the first curved side and the second curved side, and
        an upper surface opposite to the lower surface;
    forming a first arm between the first curved side and the second curved side and extending outwardly from the body, the first arm defining a first opening to receive an index finger and a middle finger of a user; and
    forming a second arm between the first curved side and the second curved side and opposite to the first arm, the second arm extending outwardly from the body and defining a second opening to receive a thumb of the user, the first arm and the second arm defining a recess above the upper surface for receiving the writing instrument;
    the index finger, the middle finger, and the thumb to grasp the writing instrument and position it freely through the recess.

11. The method of claim 10 wherein the forming of the first arm comprises forming the first opening to be larger than the second opening; wherein the forming of the body comprises forming the lower surface to comprise a flat surface, and a first slot adjacent to the first curved side, and a second slot opposite to the first slot and adjacent to the second curved side.

12. The method of claim 10 wherein the forming of the body, the forming of the first arm, and the forming of the second arm are performed integrally in a single step.

13. An ergonomic device for a writing instrument, the ergonomic device comprising:
    a body comprising
        a first curved side,
        a second curved side opposite to the first curved side, and
        a surface being transverse to and being between the first curved side and the second curved side, the surface comprising a first slot adjacent to the first curved side, and a second slot opposite to the first slot and adjacent to the second curved side;
    a first arm between the first curved side and the second curved side and extending outwardly from the body, the first arm defining a first opening to receive an index finger and a middle finger of a user; and
    a second arm between the first curved side and the second curved side and opposite to the first arm, the second arm extending outwardly from the body and defining a second opening to receive a thumb of the user.

14. The ergonomic device of claim 13 wherein the first opening is larger than the second opening.

15. The ergonomic device of claim 13 wherein the surface comprises a flat surface.

16. The ergonomic device of claim 13 wherein the surface comprises a closed passageway to receive the writing instrument.

17. The ergonomic device of claim 16 wherein the closed passageway is round-shaped.

18. The ergonomic device of claim 13 wherein the first arm comprises a first segment and a second segment opposite to the first segment, the first segment having a first curved end, a second curved end, and a medial portion between the first curved end and the second curved end, the medial portion protruding inwardly into the first opening.

19. The ergonomic device of claim 13 wherein the second opening comprises a round-shaped opening.

20. The ergonomic device of claim 13 wherein the first opening comprises an elongate-oval-shaped opening.

* * * * *